F. WOODHEAD.
PUMP.
APPLICATION FILED MAY 11, 1908.
911,929.
Patented Feb. 9, 1909.
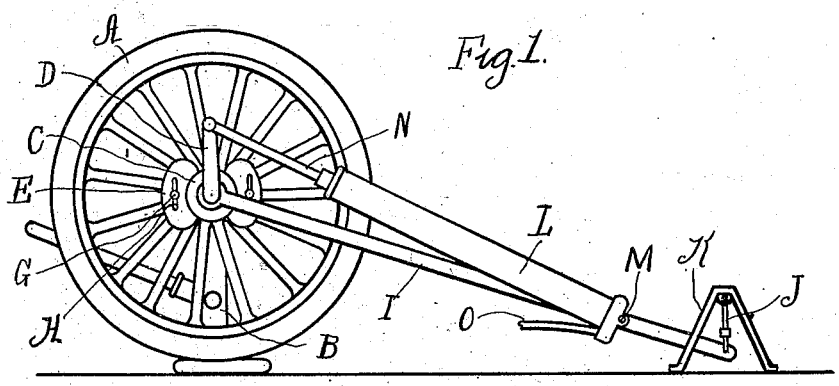
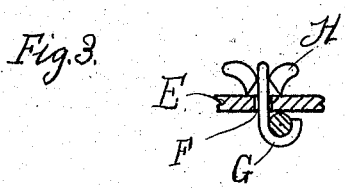
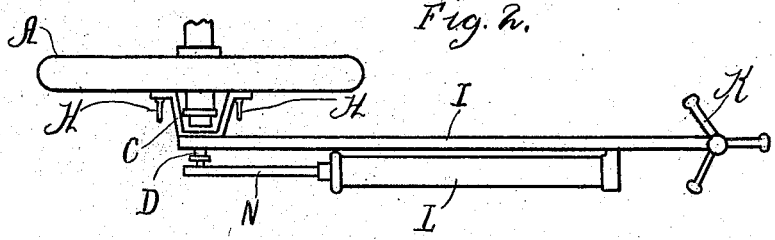
WITNESSES
INVENTOR
Frank Woodhead
BY
ATTORNEY

UNITED STATES PATENT OFFICE.

FRANK WOODHEAD, OF CHELTENHAM, PENNSYLVANIA.

PUMP.

No. 911,929.     Specification of Letters Patent.     Patented Feb. 9, 1909.

Application filed May 11, 1908. Serial No. 432,057.

*To all whom it may concern:*

Be it known that I, FRANK WOODHEAD, a citizen of the United States, residing at Cheltenham, county of Montgomery, and State of Pennsylvania, have invented a certain new and useful Improvement in Pumps, of which the following is a specification.

My invention relates to a new and useful invention in pumps and has for its object to provide an exceedingly simple and effective device of this character by means of which the power of a self propelled vehicle will be used to operate the pump for inflating the tires or wheels of said vehicle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of my improved pump showing the wheel of the vehicle to which it is attached. Fig. 2 is a plan view thereof. Fig. 3, a view of the clamp used in securing the crank bracket to the wheel, said bracket being broken away.

In carrying out my invention as here embodied A represents one of the driven wheels of a self propelled vehicle which is raised up from the ground by means of a lifting jack B. To the spokes of the wheel is secured the crank bracket C to the outer end of which is secured the crank D. The bottom portions of the legs of the crank bracket C are bent so as to form the feet E and these feet have the openings F formed therein, through which the curved bolt G is adapted to pass, the curved end thereof engaging with one of the spokes of the wheel A. The thumb nut H is then threaded on said curved bolt thus holding the crank bracket to the wheel.

On the central shaft of the crank bracket is secured one end of the rod I the opposite end being fastened to one end of the hanger J, the opposite end of said hanger being movably secured to the stand K of the rod I in proximity to that end which is secured.

To the hanger J is pivoted the pump L as indicated at M. The outer end of the plunger rod N of the pump L is secured to the free end of the crank D so that when the wheel is turned the plunger rod N will be caused to reciprocate, thus turning the air from the pump through the flexible hose O into the tire of either of the wheels of the vehicle to which the hose may be attached and when these tires are inflated the pump can be removed through the other driven wheel of the vehicle, in this way inflating the tire of the wheel to which the pump was first attached.

In practice one of the rear driven wheels of the self propelled vehicles would be lifted up by means of the lifting jack and the crank bracket C secured to the spokes of this lifted wheel by means of the curved bolt G and the thumb nut H, the power would then be applied to this raised wheel the differential gearing allowing it to revolve, which would cause the crank D to also revolve, thus reciprocating the plunger rod N to the pump L, the pump being pivoted to the rod I will allow it to move up and down, thus following the movements of the crank D.

I provide the stand and hanger to which the rod J is connected to the bracket in the motion of the brace rod in case the wheel is not true or if the crank bracket is not set on the spokes of the wheel.

One of the large advantages of my improvement is that it requires no special attachments whatever upon the car on which it is to be used.

Of course I do not wish to be limited to the exact details here shown as these may be varied within certain limits without departing from the spirit of my invention.

Having thus fully described my invention, what I claim as new and useful, is—

1. In combination a crank bracket, the legs of which are bent to form feet having openings therein, curved bolts adapted to pass through said openings, and fit about the spokes of the wheel, thumb nuts, threaded on said curved bolts, a crank fastened to the crank bracket, a stand, a hanger movably secured thereto, a rod one end being fastened to the crank bracket, the opposite end being attached to the hanger, a pump pivoted to said rod in proximity to that end which is secured to the hanger, a plunger rod, the outer end fastened to crank so that said rod will be reciprocated through the medium of the crank when the wheel to which the crank bracket is secured is revolved and a flexible hose for conveying the air from the pump to the tire which is to be inflated as shown and described.

2. In combination a crank bracket, means for securing it to the driven wheel of a self propelled vehicle, a crank secured to said crank bracket, a rod secured to said crank bracket, a pump pivoted to said rod, a plunger rod, the outer end of which is secured to the crank so that the same may be reciprocated as shown and described.

In testimony whereof, I have hereunto affixed my signature in the presence of two subscribing witnesses.

FRANK WOODHEAD

Witnesses:
 EDW. W. ANSTICE,
 S. M. GALLAGHER